United States Patent [19]
Chen

[11] Patent Number: 5,268,790
[45] Date of Patent: Dec. 7, 1993

[54] ZOOM LENS EMPLOYING REFRACTIVE AND DIFFRACTIVE OPTICAL ELEMENTS

[75] Inventor: Chungte W. Chen, Irvine, Calif.

[73] Assignee: Hughes Aircraft Company, Los Angeles, Calif.

[21] Appl. No.: 811,485

[22] Filed: Dec. 20, 1991

[51] Int. Cl.⁵ ................ G02B 5/18; G02B 15/14
[52] U.S. Cl. .................. 359/558; 359/565; 359/677; 359/684; 359/687; 359/690; 359/742
[58] Field of Search ........... 359/1, 15, 16, 19, 558, 359/565, 566, 569, 571, 676, 677, 686, 687, 689, 690, 742, 745, 685

[56] References Cited

U.S. PATENT DOCUMENTS

| | | |
|---|---|---|
| 3,784,284 | 1/1974 | Nakamura . |
| 4,072,395 | 2/1978 | Mohon ................. 359/19 |
| 5,013,133 | 5/1991 | Buralli et al. ........... 359/558 |
| 5,029,010 | 7/1991 | Shiraishi ............... 359/676 |
| 5,044,706 | 9/1991 | Chen .................. 359/357 |
| 5,148,314 | 9/1992 | Chen .................. 359/16 |
| 5,151,823 | 9/1992 | Chen .................. 359/565 |

FOREIGN PATENT DOCUMENTS 0441206 8/1991 European Pat. Off. .

OTHER PUBLICATIONS

Nakajima, "Aspheric Zoom Lens", Patent Abstracts of Japan; vol. 9, No. 281 (P-403) (2004) 8 Nov. 1985.
Noboru; "Method and Device for Flow Speed Distribution and Flowamount Measurement by Multicarrier System Laser Doppler Method"; Patent Abstracts of Japan; vol. 4, No. 146 (P-31) 15 Oct. 1980.
Stone et al; "Hybrid Diffractive-Refractive Lenses and Achromats"; Applied Optics/vol. 27, No. 14/15 Jul. 1988; pp. 2960-2971.

Primary Examiner—Bruce Y. Arnold
Assistant Examiner—R. D. Shafer
Attorney, Agent, or Firm—Michael W. Sales; Wanda K. Denson-Low

[57] ABSTRACT

A zoom lens (10) has a first lens group (12), a second lens group (14) and a third lens group (16). The first lens group relays an outside scene to an intermediate plane. The second lens group varies magnification of the relayed image from the first lens group. Also, the second lens group includes at least one diffractive optical element. The third lens group compensates for focus shift and focuses the wavefront onto the viewing plane.

8 Claims, 4 Drawing Sheets

INTERMEDIATE ZOOM POSITION

ZOOM LENS EMPLOYING REFRACTIVE AND DIFFRACTIVE OPTICAL ELEMENTS

BACKGROUND OF THE INVENTION

1. Field of the Invention

The present invention relates to a zoom lens and, more particularly, to a zoom lens having refractive and diffractive optical elements.

2. Description of Related Art

Zoom lenses have been utilized in the art for quite some time. The zoom lenses at the telephoto mode magnify an object being viewed to provide the viewer with a view of a distant scene. On the other hand, the zoom lenses at the wide field of view modes cover very wide angle scenes. Generally, the zoom lenses are formed from refractive, reflective or a combination of refractive and reflective elements. The packaging of the zoom lens generally dictates the type of optical elements which are present.

Generally, in an all refractive zoom lens assembly, the assembly includes several lens groups. Turning to FIG. 1, a first lens group 1, which is called a focusing group, is used to relay an outside scene onto an intermediate plane. The second lens group 2, which is known as a variator, is generally a virtual relay and is used to vary the magnification of the zoom lens. Ordinarily, it is regarded as the "engine" of the zoom lens. The variator is moved back and forth to change the effective focal length of the system. A third lens group 3 is used to compensate for the focus shift introduced during the zoom process and is generally referred to as a compensator. For many zoom lens systems, the wavefront emerging from the compensator is either collimated or near collimated. The fourth lens group 4 is referred to as a prime group. The fourth lens group 4 is used to focus the wavefront emerging from the compensator onto a viewing plane. Also, some zoom lenses combine the compensator 3 and prime group 4 as a single unit.

U.S. Pat. No. 3,784,284, issued Jan. 8, 1974 to Nakamura, illustrates a zoom lens like that described above. While providing a zoom lens having a varying focal length, the zoom lens has several disadvantages. One disadvantage is that it is an all-refractive lens and is heavy and bulky. The lens has an effective focal length range from 7.5 mm to 56.3 mm. Also, the main limitation dominating the complexity of this type of lens system is chromatic aberration correction. At the long effective focal length zoom positions, axial chromatic aberration and spherochromatism are the limiting aberrations. At the short effective focal length zoom positions, lateral chromatic aberration is the dominating aberration. In order to stabilize the chromatic aberration during zoom, each group requires flint-glass lenses to either partially or fully correct the chromatic aberration. The chromatic aberration correction of the focusing group and the variator is particularly critical. Unfortunately, each group can evolve to a form which is bulky and complicated and this takes away from the available zoom space. Therefore, the zoom range is seriously jeopardized. In addition, some residual third and higher order aberrations are created as a result of steeper lens curvatures.

SUMMARY OF THE INVENTION

Accordingly, the new and improved optical zoom system of the present invention provides the art with improved aberration reduction. Zoom lenses of the present invention have reduced levels of third and higher order residual monochromatic aberrations. The present invention provides a zoom lens with a wider zoom range, a simpler optical form and provides a more compact package. Also, the present invention reduces the weight of the moving lens element groups. Thus, the present invention provides a zoom lens which is lighter weight, relatively less expensive, and more agile during the zoom process with a wider zoom range by using diffractive elements.

In the preferred embodiment of the invention, the zoom lens includes a first lens group for relaying an image of an outside scene to an intermediate plane. A second lens group is positioned to receive the image wavefront from the first lens group. The second lens group varies the magnification of the zoom lens. Also, the second lens group includes at least one diffractive optical element. A third lens group compensates for focus shift and focuses the wavefront onto the viewing plane.

Generally, the third lens group is broken down into a third and fourth lens groups. The third lens group compensates for focus shift and the fourth lens group focuses the image on the viewing plane. The third lens group would also include a diffractive optical element.

From the subsequent description and the appended claims taken in conjunction with the accompanying drawings, other objects and advantages of the present invention will become apparent to those skilled in the art.

DESCRIPTION OF THE PREFERRED EMBODIMENT

Figure 2:
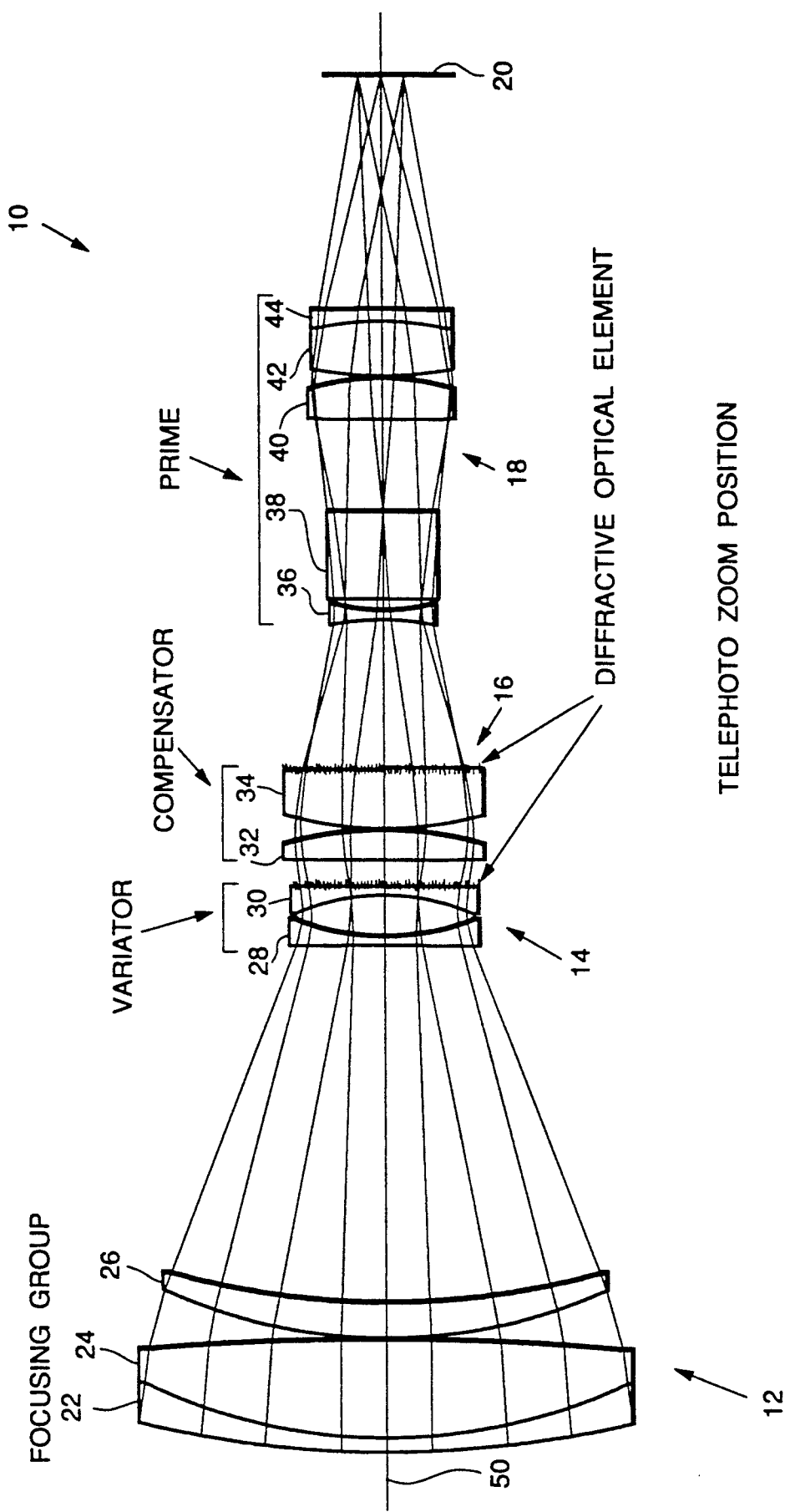
FIG. 2 is a schematic view of a zoom optical system in accordance with the present invention.
Figure 3:
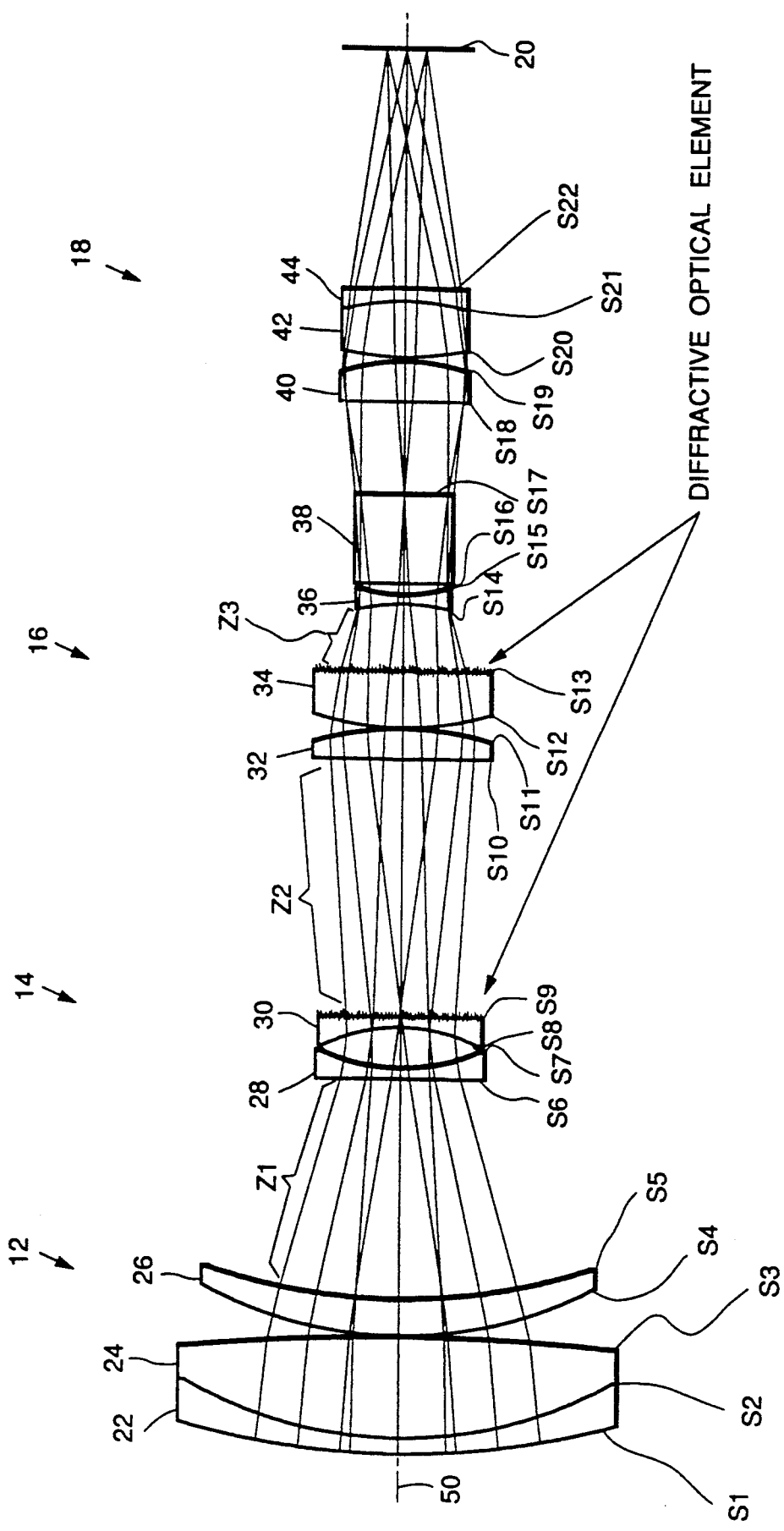
FIG. 3 is a schematic view like that of FIG. 2 at an intermediate focal length.
Figure 4:
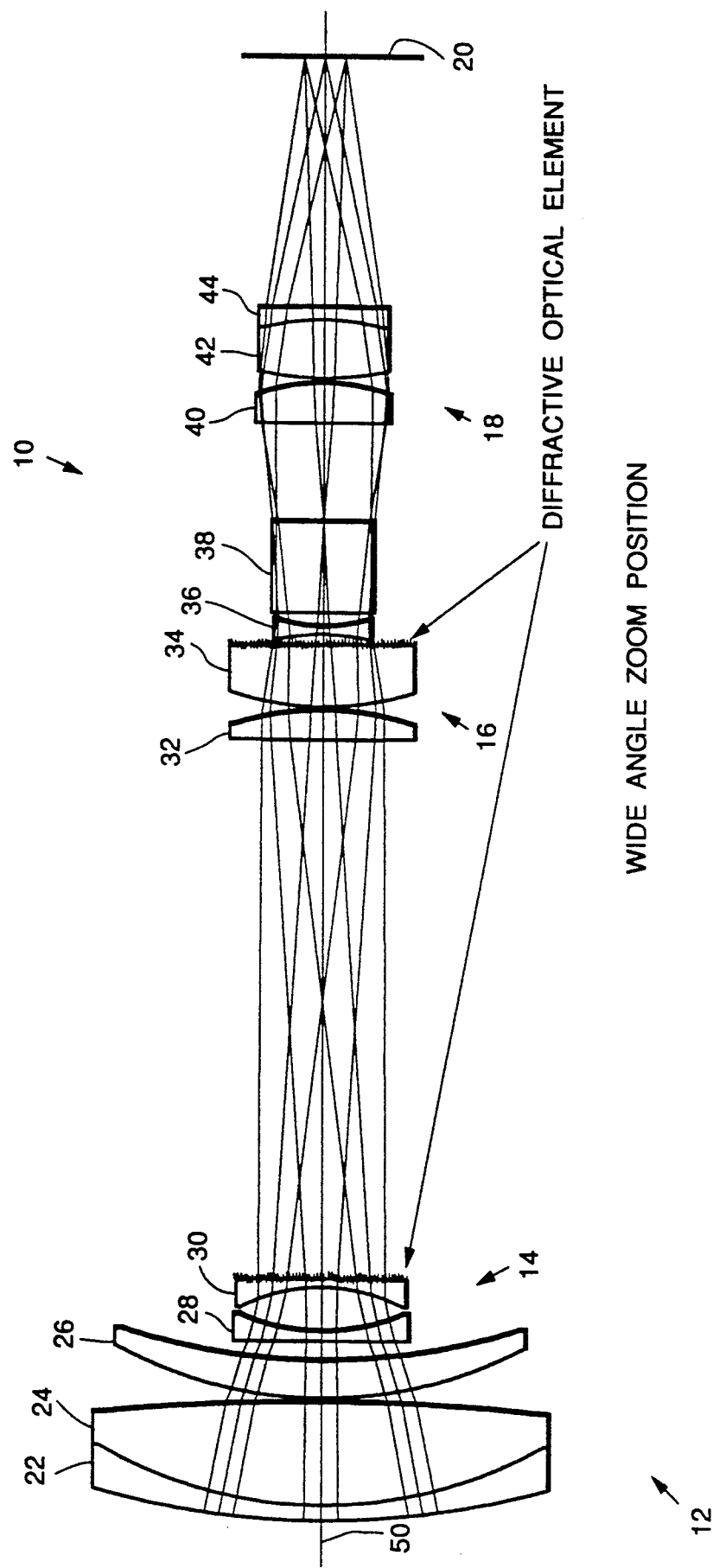
FIG. 4 is a schematic view like that of FIG. 2 at a minimum focal length.

Turning to FIGS. 2 through 4, a zoom optical lens system according to the invention is illustrated and designated with the reference numeral 10. The system 10 includes a first lens group 12, a second lens group 14, a third lens group 16 and a fourth lens group 18. The lens groups focus an image on a viewing plane 20.

The first lens group commonly referred to as the focusing group, includes three lenses. The lens 22, lens 24 and lens 26 of the focusing group are generally positioned on an optical axis 50 defined by the lens 22. Generally, the lens 22, lens 24 and lens 26 are convex-concave, biconvex and convex-concave lenses, respectively. The lenses 22, 24 and 26 are formed from SF13, LAK7 and BK7 glass materials, respectively. All the lenses have a predetermined radius of curvature on their front and back surfaces of the lens. Also, the lenses have a predetermined thickness at their vertexes and predetermined aperture sizes on their front and back surfaces.

The second group of lenses 14 which is generally referred to as a variator, includes a pair of optical elements. The variator lens 28 and lens 30 are generally centered on the optical axis 50. The lens 28 is generally a biconcave lens formed from a LF5 glass material. The lens 28 has a predetermined radius of curvature on its front and back surfaces. Also, the lens 28 has a predetermined thickness at its vertex and predetermined aperture sizes on its front and back surfaces.

The variator lens 30 is a refractive-diffractive hybrid optical element. The refractive-diffractive optical element is formed from a BK7 material. The refractive-diffractive optical element generally has a concave front surface and a planar back surface. The surfaces have a predetermined radius of curvature. Also, the lens has a predetermined thickness at its vertex and predetermined aperture sizes on its front and back surfaces. The refractive-diffractive hybrid optical element 30 is likewise positioned on the optical axis 50. The diffractive optical element of the hybrid lens 30 is a kinoform or kinoform equivalent Fresnel zone plate. Although the Fresnel zone plate can be imprinted on either a planar surface or curved surface, a planar surface is generally easier for fabrication.

The third lens group 16, generally referred to as the compensator, includes a pair of optical elements. The compensator first optical element lens 32 is generally a biconvex lens formed from a LAKN7 glass material. The lens 32 has a predetermined radius of curvature on its front and back surfaces. Also, the lens 32 has a predetermined thickness at its vertex and a predetermined aperture size on its front and back surfaces.

The optical element 34 is a refractive-diffractive hybrid optical element. Generally, the optical element 34 has a convex planar configuration formed from a LAK11 material. The element 34 has a predetermined radius of curvature on its front and rear surfaces as well as a predetermined thickness at its vertex and predetermined aperture sizes on its front and back surfaces.

The variator 14 and compensator 16 move with respect to one another to multiple positions between the first and fourth lens group as seen in FIGS. 2 through 4. As the variator and compensator move, the effective focal length of the system is changed.

The fourth lens group 18, generally referred to as the prime group, includes five lenses. The lenses 36, 38, 40, 42 and 44 are centered with respect to the optical axis 50. Also, this group focuses the radiation emerging from the compensator 16 to the viewing plane 20. Generally, the lenses 36, 38, 40, 42 and 44 are biconcave, cube, biconvex, biconvex and concave-convex, respectively. Each lens has a predetermined radius of curvature on its front and back surface as well as a predetermined thickness at its vertex and predetermined aperture sizes on its front and back surfaces. The cube 38 is generally a beam-splitting device to sample the radiation emerging from the previous lenses.

Generally, the focusing group relays an image of an outside scene to the viewing plane. The variator varies the magnification of the wavefront, including an image of the scene, as it passes through the system. The compensator acts on the wavefront to compensate for focus shift of the wavefront as it passes through the system. The prime group then focuses the wavefront onto the viewing plane 20.

Figure 1:
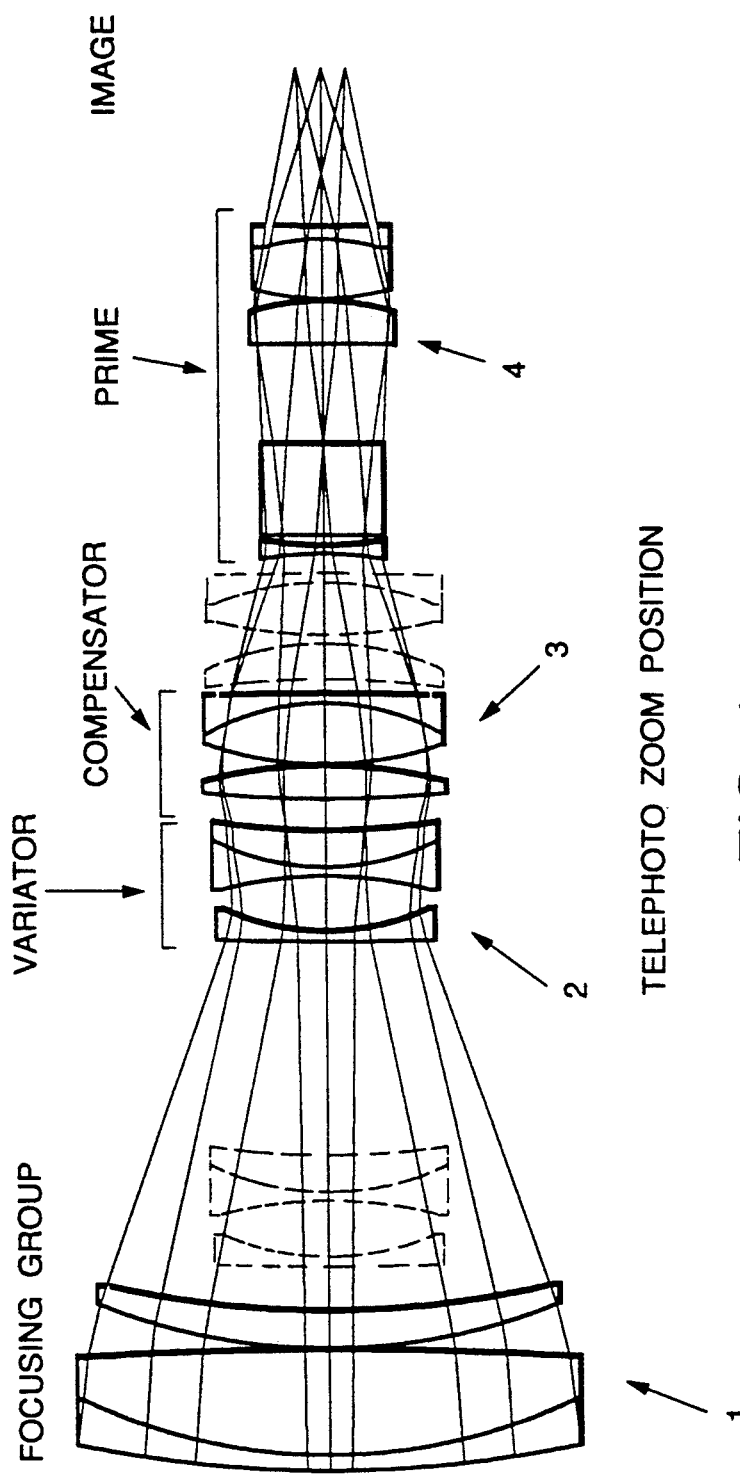
FIG. 1 is a schematic view of a relevant art refractive zoom lens system.

The zoom system illustrated in FIGS. 2 through 4 is in the same optical space as the zoom system of FIG. 1. The effective focal length range of the zoom system of FIG. 1 is from 7.5 mm to 56.3 mm, as illustrated in phantom. The present system provides an effective focal length between 7.5 mm to 75 mm in the same optical space, thus, the present zoom provides a 10:1 magnification ratio compared to the 7.5:1 range of the relevant art. This is a 33% extension in the zooming range through the use of the optical arrangement of the present invention.

A specific prescription for a zoom lens configuration is given in the following table:

TABLE 1

| Element Number | Surface Number | Radius of Curvature | Thickness | Glass |
|---|---|---|---|---|
| Lens 22 (S1–S2) | S1 | 80.5125 | 1.40000 | Ohara SF13 |
| Lens 24 (S2–S3) | S2 | 43.3484 | 9.50000 | Ohara LAK7 |
| | S3 | −217.721 | | |
| Gap | | | 0.100000 | Air |
| Lens 26 (S4–S5) | S4 | 41.6851 | 3.40000 | Schott BK7 |
| | S5 | 61.4151 | | |
| Gap | | | $Z_1$ | Air |
| Lens 28 (S6–S7) | S6 | −900.577 | 0.900000 | Schott LF5 |
| | S7 | 19.2063 | | |
| Gap | | | 3.93483 | Air |
| Lens 30 (S8–S9) | S8 | −17.5096 | 0.800000 | Schott BK7 |
| | S9 | Infinite | 0.000000 | Diffractive Optical Element 1 |
| Gap | | | $Z_2$ | Air |
| Lens 32 (S10–S11) | S10 | 661.786 | 2.90000 | Schott LAKN7 |
| | S11 | −29.0168 | | |
| Gap | | | 0.100000 | Air |
| Lens 34 (S12–S13) | S12 | 28.5963 | 5.50000 | Ohara LAK11 |
| | S13 | 0.000000E + 00 | 0.00000 | Diffractive Optical Element 2 |
| Gap | | | $Z_3$ | Air |
| Lens 36 (S14–S15) | S14 | −20.6652 | 0.800000 | Schott BK7 |
| | S15 | 14.5234 | | |
| Gap | | | 1.20000 | Air |
| Lens 38 (S16–S17) | S16 | 0.000000E + 00 | 8.30000 | Schott LF7 |
| | S17 | 0.000000E + 00 | | |
| Gap | | | 8.90000 | Air |
| Lens 40 (S18–S19) | S18 | 659.103 | 3.90000 | Schott LAKN7 |
| | S19 | −19.2241 | | |
| Gap | | | 0.200000 | Air |
| Lens 42 (S20–S21) | S20 | 29.6660 | 5.30000 | Schott SK16 |
| Lens 44 (S21–S22) | S21 | −22.6192 | 1.20000 | Schott SF6 |
| | S22 | −180.939 | | |
| Gap Plane 20 | | | 22.30180 | Air |

The wavefront information of both diffractive optical elements 1 and 2 is $f_{1(\rho)}$ and $f_{2(\rho)}$, respectively
Where $\rho$ is the radial coordinate of aperture in the unit of mm,
$f_{1(\rho)} = 2.43875\rho^2 - 1.0545\,(E\text{-}2)\rho^4$
and $f_{2(\rho)} = (-2.07051)\rho^2 + 6.13061\,(E\text{-}3)\rho^4$
The zone plate ring boundaries of the diffractive optical element 1 are located at $f_{1(\rho)} = n$  n is an integer
Similarly the zone plate ring boundaries of the diffractive optical element 2 are at $f_{2(\rho)} = n$  n is an integer
The selected diffractive orders for the diffractive optical elements 1 and 2 are +1 order and −1 order, respectively
(+) Radii have centers to the right
(−) Radii have centers to the left
Thickness is axial distance to next surface
Dimensions are given in millimeters
Reference Wavelength = 0.58756 μm
Spectral Range is from 0.48610 μm to 0.65627 μm

| EFL (mm) | Group Space | | |
|---|---|---|---|
| | $Z_1$ (mm) | $Z_2$ (mm) | $Z_3$ (mm) |
| 7.503 | 1.729 | 48.861 | 0.980 |
| 21.798 | 20.828 | 24.401 | 6.341 |
| 74.994 | 34.184 | 2.555 | 14.831 |

It should be noted that the above prescription is an example for illustrative purposes and should not be construed in any way to limit the present invention.

An advantage of the present invention is that the zoom lens is able to vary the magnification continuously and may be used in several optical sensors. The present invention may be utilized in display technology area such as the color projection optics for the next generation of flight simulators. The present invention provides a wide range zoom to simulate the range changes of both the target and the scene. Also, the present invention may be utilized as a photographic zoom lens.

While it will be apparent that the preferred embodiment is well calculated to fill the above stated objects, it will also be appreciated that the present invention is susceptible to modification, variation, alteration and change without varying from the proper scope and fair meaning of the subjoined claims.

What is claimed is:

1. A zoom lens comprising:
   first lens group means for relaying an image of an outside scene to an intermediate plane;
   second lens group means for varying magnification of the relayed image from the first lens group, said second lens group means including at least one diffractive optical element; and
   third lens group means for compensating for focus shift and for focusing the image onto a viewing plane, wherein said third lens group means includes a first lens sub-group to compensate for focus shift and a second lens sub-group to focus the image on said viewing plane.

2. The zoom lens according to claim 1 wherein said third lens group means includes at least one diffractive optical element.

3. The zoom lens according to claim 1 wherein said second lens group means is movable to change effective focal length of the zoom lens.

4. A zoom lens comprising:
   a first lens group for relaying an image of an outside scene to an intermediate plane;
   a second lens group for varying magnification of the relayed image from the first lens group, said second lens group including at least one diffractive optical element and at least one refractive element;
   a third lens group for compensating for focus shift of the image passing through said lens groups; and
   a fourth lens group for focusing the image onto a viewing plane.

5. The zoom lens according to claim 4 wherein said diffractive optical element is positioned between said refractive optical element and said third lens group.

6. The zoom lens according to claim 4 wherein said third lens group includes at least one diffractive optical element.

7. The zoom lens according to claim 6 wherein said third lens group includes at least one refractive optical element.

8. The zoom lens according to claim 7 wherein said third lens group diffractive optical element is positioned between said refractive optical element of said third lens group and said fourth lens group.

* * * * *